(12) United States Patent
Hyodo et al.

(10) Patent No.: US 7,292,268 B2
(45) Date of Patent: Nov. 6, 2007

(54) IMAGE PROCESSING SYSTEM, IMAGE CAPTURING APPARATUS, IMAGE PROCESSING APPARATUS, AND IMAGE PROCESSING METHOD FOR PERFORMING EDGE ENHANCEMENT

(75) Inventors: Manabu Hyodo, Saitama (JP); Koichi Sakamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 552 days.

(21) Appl. No.: 10/303,028

(22) Filed: Nov. 25, 2002

(65) Prior Publication Data

US 2003/0098915 A1    May 29, 2003

(30) Foreign Application Priority Data

Nov. 29, 2001  (JP) ............................. 2001-364935

(51) Int. Cl.
*H04N 5/225* (2006.01)
*H04N 5/76* (2006.01)
*H04N 5/262* (2006.01)
*H04N 5/208* (2006.01)

(52) U.S. Cl. ............................. 348/207.2; 348/231.6; 348/240.2; 348/252

(58) Field of Classification Search ............ 348/207.2, 348/240.2, 231.3, 231.99, 231.6, 207.1, 207.11, 348/252
See application file for complete search history.

(56) References Cited

U.S. PATENT DOCUMENTS

| | | | | |
|---|---|---|---|---|
| 5,031,227 A | * | 7/1991 | Raasch et al. | 382/199 |
| 5,262,867 A | * | 11/1993 | Kojima | 348/39 |
| 5,271,064 A | * | 12/1993 | Dhawan et al. | 382/266 |
| 5,602,942 A | * | 2/1997 | Takemoto et al. | 382/263 |
| 5,696,850 A | * | 12/1997 | Parulski et al. | 382/261 |
| 5,838,371 A | * | 11/1998 | Hirose et al. | 348/240.2 |
| 5,875,268 A | * | 2/1999 | Miyake | 382/276 |
| 6,011,547 A | * | 1/2000 | Shiota et al. | 382/254 |
| 6,363,526 B1 | * | 3/2002 | Vlahos et al. | 725/37 |
| 6,614,474 B1 | * | 9/2003 | Malkin et al. | 348/252 |
| 6,628,329 B1 | * | 9/2003 | Kelly et al. | 348/252 |
| 6,718,074 B1 | * | 4/2004 | Dutta-Choudhury et al. | 382/299 |
| 6,721,459 B1 | * | 4/2004 | Honsinger et al. | 382/263 |
| 6,850,275 B1 | * | 2/2005 | Minakami | 348/252 |
| 6,956,604 B1 | * | 10/2005 | Keupp et al. | 348/207.2 |
| 7,110,026 B2 | * | 9/2006 | Feldis, III | 348/231.6 |

FOREIGN PATENT DOCUMENTS

| | | |
|---|---|---|
| JP | 6-261238 A | 9/1994 |
| JP | 2001-177719 A | 6/2001 |

* cited by examiner

*Primary Examiner*—Vivek Srivastava
*Assistant Examiner*—Richard M Bemben
(74) *Attorney, Agent, or Firm*—Birch, Stewart, Kolasch & Birch, LLP (57) ABSTRACT

An image capturing apparatus which records information, indicating a procedure of resolution conversion processing performed on the image, into image data and outputs the image and the information. The image capturing apparatus, which captures a subject, includes an image pick-up unit which captures an image, a resolution conversion unit which performs resolution conversion processing on the image, and a storing unit which stores the image resolution conversion information, which indicates a procedure of the resolution conversion processing by the resolution conversion unit, in association with the image.

7 Claims, 7 Drawing Sheets

IMAGE PROCESSING SYSTEM, IMAGE CAPTURING APPARATUS, IMAGE PROCESSING APPARATUS, AND IMAGE PROCESSING METHOD FOR PERFORMING EDGE ENHANCEMENT

This patent application claims priority from a Japanese patent application No, 2001-364935 filed on Nov. 29 2001, the contents of which are incorporated herein by reference.

BACKGROUND OF THE INVENTION

1. Field of the Invention

The present invention relates to an image processing system, an image capturing apparatus, an image processing apparatus, an image processing method, and a computer-readable medium storing program. More particularly, the present invention relates to an image processing system which can perform image processing appropriately on images captured by an image capturing apparatus.

2. Description of Related Art

A conventional digital camera performs an edge enhancement processing, which is an image processing for enhancing edge of an image captured using electronic zoom function of the camera. A procedure of the edge enhancement processing varies with models of digital camera. For example, there is a digital camera which has a fixed level of the edge enhancement processing regardless of zoom magnification of electronic zoom, or a digital camera the level of the edge enhancement processing varies according to zoom magnification of electronic zoom, as disclosed, for example, in a Japanese patent application publication No. 06-261238. Also, a conventional printer performs predetermined edge enhancement processing on an image captured by a digital camera, and prints the image out.

However, the conventional printer performs a predetermined edge enhancement processing on the image captured by a digital camera regardless of whether an image, on which edge enhancement processing is performed by an image capturing apparatus at fixed level regardless of a zoom magnification of electronic zoom, or an image, on which edge enhancement processing is performed by an image capturing apparatus at variable level according to zoom magnification of electronic zoom. Accordingly, there is a possibility that the conventional printer performs an inappropriate edge enhancement processing on the image and prints the image out.

SUMMARY OF THE INVENTION

Therefore, it is an object of the present invention to provide an image processing system, an image capturing apparatus, an image processing apparatus, an image processing method, and a computer-readable medium storing program which can solve the foregoing problem. The above and other subjects can be achieved by combinations described in the independent claims. The dependent claims define further advantageous and exemplary combinations of the present invention.

According to the first aspect of the present invention, there is provided an image processing system including an image capturing apparatus which captures an image of a subject and an image processing apparatus which performs image processing on the image. The image capturing apparatus includes an image pick-up unit which captures the image, a resolution conversion unit which performs resolution conversion processing on the image, a storing unit which stores resolution conversion information in association with the image, the resolution conversion information indicating a procedure of the resolution conversion processing performed by the resolution conversion unit, and an output unit which outputs the resolution conversion information in association with the image, on which resolution conversion processing is performed. The image processing system includes, a receiving unit which receives the image and the resolution conversion information, an edge enhancement processing unit which performs edge enhancement processing on the image, and a control unit which controls a level of edge enhancement processing by the edge enhancement processing unit based on the resolution conversion information.

The image capturing apparatus may further include an edge enhancement processing unit which performs edge enhancement processing on the image, and the storing unit of the image capturing apparatus may further store edge enhancement processing information, which indicates a procedure of the edge enhancement processing performed by the edge enhancement processing unit, in association with the image, the output unit of the image capturing apparatus further outputs the edge enhancement processing information in association with the image, the receiving unit of the image processing apparatus may further receive the edge enhancement processing information, and the control unit of the image processing apparatus may further control a level of edge enhancement processing by the edge enhancement processing unit based on the edge enhancement processing information.

According to the second aspect of the present invention, there is provided an image capturing apparatus which captures a subject. The image capturing apparatus includes an image pick-up unit which captures an image, a resolution conversion unit which performs resolution conversion processing on the image, and a storing unit which stores resolution conversion information in association with the image, the resolution conversion information indicating a procedure of the resolution conversion processing performed by the resolution conversion unit.

The resolution conversion unit may convert resolution of the image by interpolation processing in electronic zoom processing, and the storing unit may store information, which indicates zoom magnification of the electronic zoom processing, as the resolution conversion information.

The image capturing apparatus may further include an edge enhancement processing unit which performs edge enhancement processing on the image, and the storing unit may further store edge enhancement processing information, which indicates a procedure of the edge enhancement processing performed by the edge enhancement processing unit, in association with the image.

The image capturing apparatus may further include an output unit which outputs the resolution conversion information and the edge enhancement processing information in association with the image, on which resolution conversion processing is performed.

According to the third aspect of the present invention, there is provided an image processing apparatus which performs image processing on an image. The image processing apparatus includes a receiving unit which receives the image and resolution conversion information which indicates a procedure of resolution conversion processing performed on the image, an edge enhancement processing unit which performs edge enhancement processing on the image, and a control unit which controls a level of edge enhancement processing performed by the edge enhancement processing unit based on the resolution conversion information.

The control unit may enlarge a level of edge enhancement processing performed by the edge enhancement processing unit as a level of resolution conversion, which is indicated in the resolution conversion information, becomes high.

It the resolution conversion processing is resolution conversion by interpolation processing in electronic zoom processing, the receiving unit may receive information which indicates zoom magnification of the electronic zoom processing as the resolution conversion information, and the control unit may control a level of edge enhancement processing performed by the edge enhancement processing unit based on the zoom magnification.

The control unit may enlarge a level of edge enhancement processing performed by the edge enhancement processing unit as the zoom magnification becomes high.

The receiving unit may further receive edge enhancement processing information which indicates a procedure of edge enhancement processing performed on the image, and the control unit may further control a level of edge enhancement processing performed by the edge enhancement processing unit based on the edge enhancement processing information.

If the edge enhancement processing information is information which indicates that edge enhancement processing is performed according to the resolution conversion processing, the control unit may control a level of edge enhancement processing performed by the edge enhancement processing unit to a predetermined level.

The image processing apparatus may further include a printing unit which prints out the image, on which edge enhancement processing is performed by the edge enhancement processing unit.

According to the fourth aspect of the present invention, there is provided an image processing method which performs image processing on an image. The image processing method includes steps of receiving the image and resolution conversion information which indicates a procedure of resolution conversion processing performed on the image, performing edge enhancement processing on the image, and controlling a level of edge enhancement processing performed in the edge enhancement processing performing step based on the resolution conversion information.

According to the fifth aspect of the present invention, there is provided a computer readable medium storing thereon a program for an image capturing apparatus which captures an image of a subject. The program includes an image pick-up module which allows the image capturing apparatus to capture the image, a resolution conversion module which allows the image capturing apparatus to perform resolution conversion processing on the image, and a storing module which allows the image capturing apparatus to store resolution conversion information in association with the image, the resolution conversion information indicating a procedure of the resolution conversion processing performed by the resolution conversion module.

According to the sixth aspect of the present invention, there is provided a computer readable medium storing thereon a program for an image processing apparatus which performs image processing on an image. The program includes a receiving module which allows the image processing apparatus to receive the image and resolution conversion information which indicates a procedure of resolution conversion processing performed on the image, an edge enhancement processing module which allows the image processing apparatus to perform edge enhancement processing on the image, and a control module which allows the image processing apparatus to control a level of the edge enhancement processing by the edge enhancement processing module based on the resolution conversion information.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
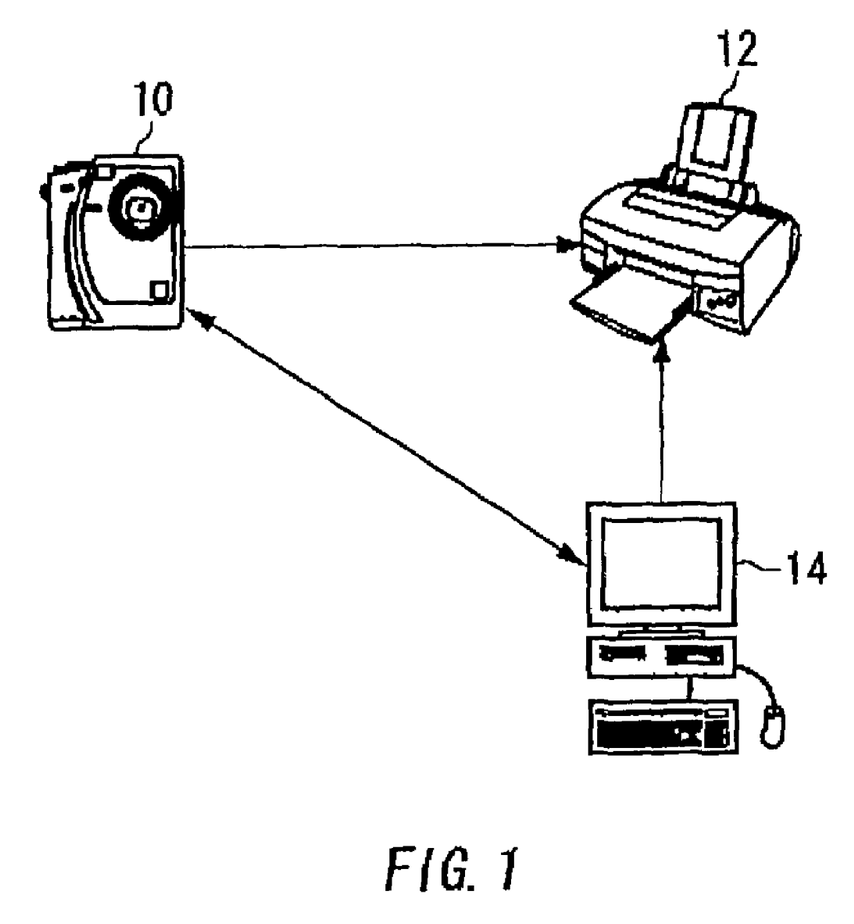
FIG. 1 is a schematic view illustrating an image processing system according to an embodiment of the present invention.

FIG. 1 is a schematic view illustrating an image processing system according to an embodiment of the present invention. The image processing system includes a digital camera 10, a printer 12, and a personal computer 14. The digital camera 10, the printer 12, and the personal computer 14 communicate with one another through a data transmission line. The data transmission line is, for example, a cable communication medium, such as IEEE1394 or USB, or a radio communication medium, such as IrDA, Bluetooth or wireless LAN. The data transmission line may be a network which includes a plurality of cable-communication media and radio-communication media, e.g., the Internet. A record medium, such as removable medium, may be used for delivery of the data among the digital camera 10, the printer 12, and the personal computer 14.

The digital camera 10 captures an image of a subject and transmits the captured image data to the printer 12 or the personal computer 14. The digital camera 10 also records image pick-up condition information into the image data, the image pick-up condition information indicating a status when the image of the subject is captured. Then, the digital camera 10 transmits it to the printer 12 or the personal computer 14. The printer 12 or the personal computer 14 performs predetermined image processing on the received image data, and outputs the image data. That is, the printer 12 prints out the image data, and the personal computer 14 outputs the image data to a display. The personal computer 14 transmits setting information to the digital camera 10 or the printer 12 to change the setting information of the digital camera 10 or the printer 12.

The digital camera 10 is an example of an image capturing apparatus and/or an image processing apparatus, and the printer 12 and the personal computer 14 are examples of the image processing apparatus. The image capturing apparatus may be a digital still camera which photographs a still image, and may be a digital camcorder which takes movies. The image processing apparatus may be a printer for a photo processing shop, which automatically adjusts the quality of the image captured by the digital camera, and prints the image out.

The image processing apparatus of the present invention may include displaying device such as a CRT, a liquid crystal display, a plasma display, various types of electronic papers, or an organic electroluminescence display, and may perform image processing on the image which appears on the displaying device.

Figure 2:
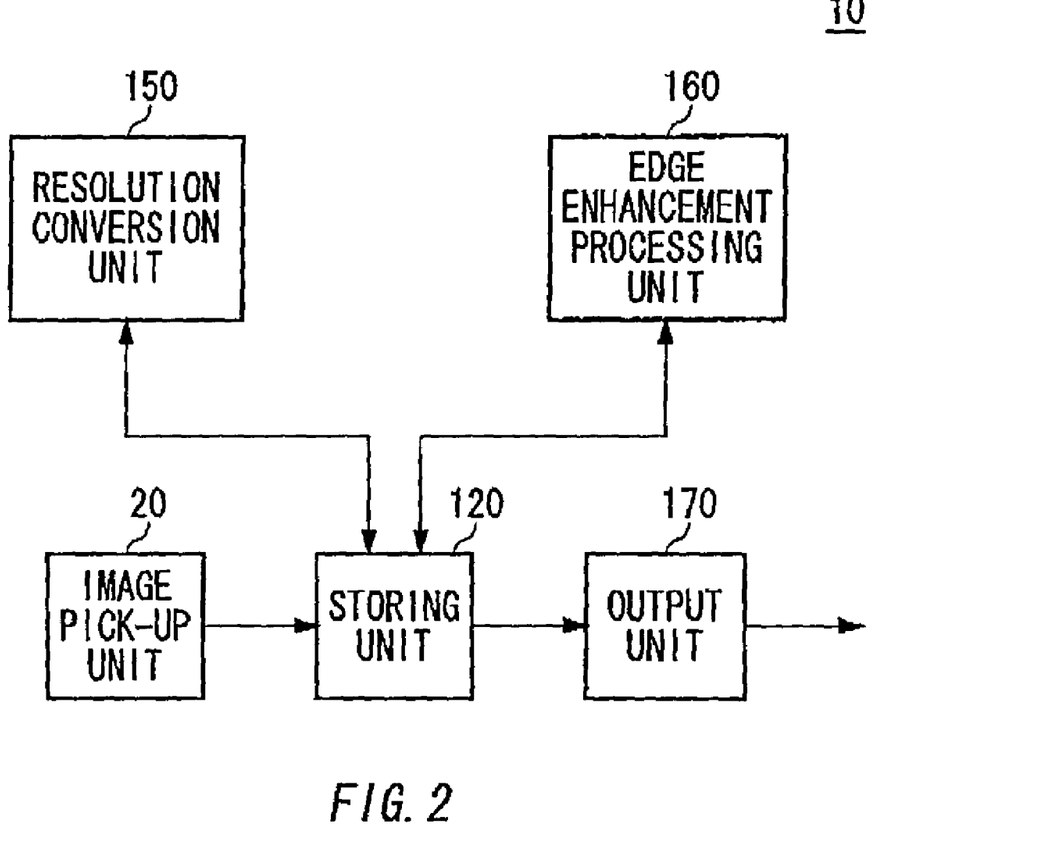
FIG. 2 is a block diagram showing an example of a functional configuration of a digital camera according to the present embodiment.

FIG. 2 is a block diagram showing an example of a functional configuration of the digital camera 10 according to the present embodiment. The digital camera 10 includes an image pick-up unit 20 which captures an image of a subject, a storing unit 120 which stores image data of the captured image, a resolution conversion unit 150 which converts resolution of the image, an edge enhancement processing unit 150 which performs edge enhancement processing on the image, and an output unit 170 which outputs the image data to an external equipment.

The resolution conversion unit 150 converts the resolution of the image stored in the storing unit 120. For example, the resolution conversion unit 150 converts the resolution of the image by an interpolation processing in the electronic zoom processing, The resolution conversion unit 150 may convert the resolution of the image by changing the number of recording pixels of the image stored in the storing unit 120. The electronic zoom processing trims a part of the image acquired by the image pick-up unit 20, and performs interpolation processing on the trimmed image. Furthermore, the interpolation processing may be either interpolation processing to increase the number of pixels of the image, or interpolation processing to decrease the number of pixel of the image.

The edge enhancement processing unit 160 performs edge enhancement processing on the image stored in the storing unit 120. The edge enhancement processing unit 160 may either perform edge enhancement processing on the image received by the storing unit 120 from the image pick-up unit 20, or perform edge enhancement processing on the image, on which resolution conversion processing is performed by the resolution conversion unit 150, after being received by the storing unit 120 from the image pick-up unit 20.

The storing unit 120 stores resolution conversion information which indicates a procedure of the resolution conversion processing by the resolution conversion unit 150, and edge enhancement processing information which indicates a procedure of the edge enhancement processing by the edge enhancement processing unit 160, in association with the image. For example, the storing unit 120 stores at least one of information which indicates whether electronic zoom processing is performed, information which indicates zoom magnification in electronic zoom processing, information which indicates resolution before and after the resolution conversion, information which indicates the number of pixels interpolated by the interpolation processing, or the like, as the resolution conversion information.

The storing unit 120 also stores, for example, at least one of information which indicates whether edge enhancement processing is performed, information which indicates whether the edge enhancement processing is performed before the resolution conversion processing or it is performed after the resolution conversion processing, information which indicates whether the edge enhancement processing is performed according to the resolution conversion, information which indicates a level of the edge enhancement processing performed on the image, or the like, as the edge enhancement processing information.

The output unit 170 outputs the resolution conversion information and the edge enhancement processing information of the image in association with the image to an external equipment such as a memory card or the printer 12.

Figure 3:
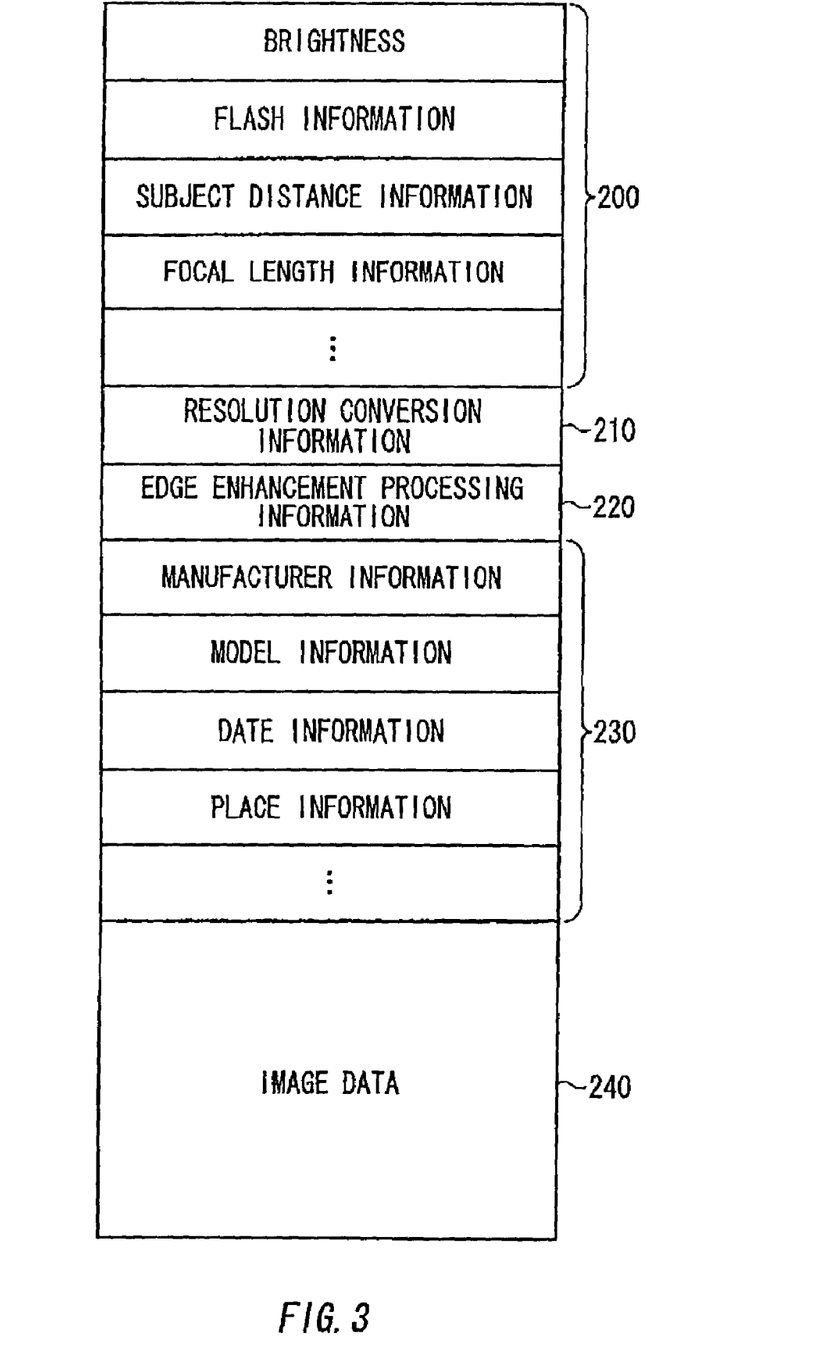
FIG. 3 is a table showing an example of a data format outputted from an output unit.

FIG. 3 is a table showing an example of a data format outputted from the output unit 170. The data outputted from the output unit 170 includes image pick-up condition information 200, resolution conversion information 210, edge enhancement processing information 220, incidental information 230, and image data 240. The image pick-up condition information 200 is a value of brightness which indicates brightness of a captured subject, flash information which indicates whether an electric flash is used at the time of image pick-up, subject distance information which indicates distance between the digital camera 10 and the subject at the time of image pick-up, focal length information which indicates the focal length at the time of image pick-up, and the like.

For example, the resolution conversion information 210 is at least one of information which indicates whether electronic zoom processing is performed, information which indicates zoom magnification in electronic zoom processing, information which indicates resolution before and after the resolution conversion processing, information which indicates the number of pixels interpolated by the interpolation processing, or the like. The edge enhancement processing information 220 is, for example, at least one of information which indicates whether edge enhancement processing is performed, information which indicates whether the edge enhancement processing is performed before the resolution conversion or it is performed after the resolution conversion, information which indicates whether the edge enhancement processing is performed according to the resolution conversion, information which indicates a level of the edge enhancement performed on the image, or the like.

The incidental information 230 is such as manufacturer information, model information, date information which indicates a date when the image is captured, or place information which indicates a place where the image is captured. The image data 240 is data in which the image is stored, e.g., data in JPEG form.

Figure 4:
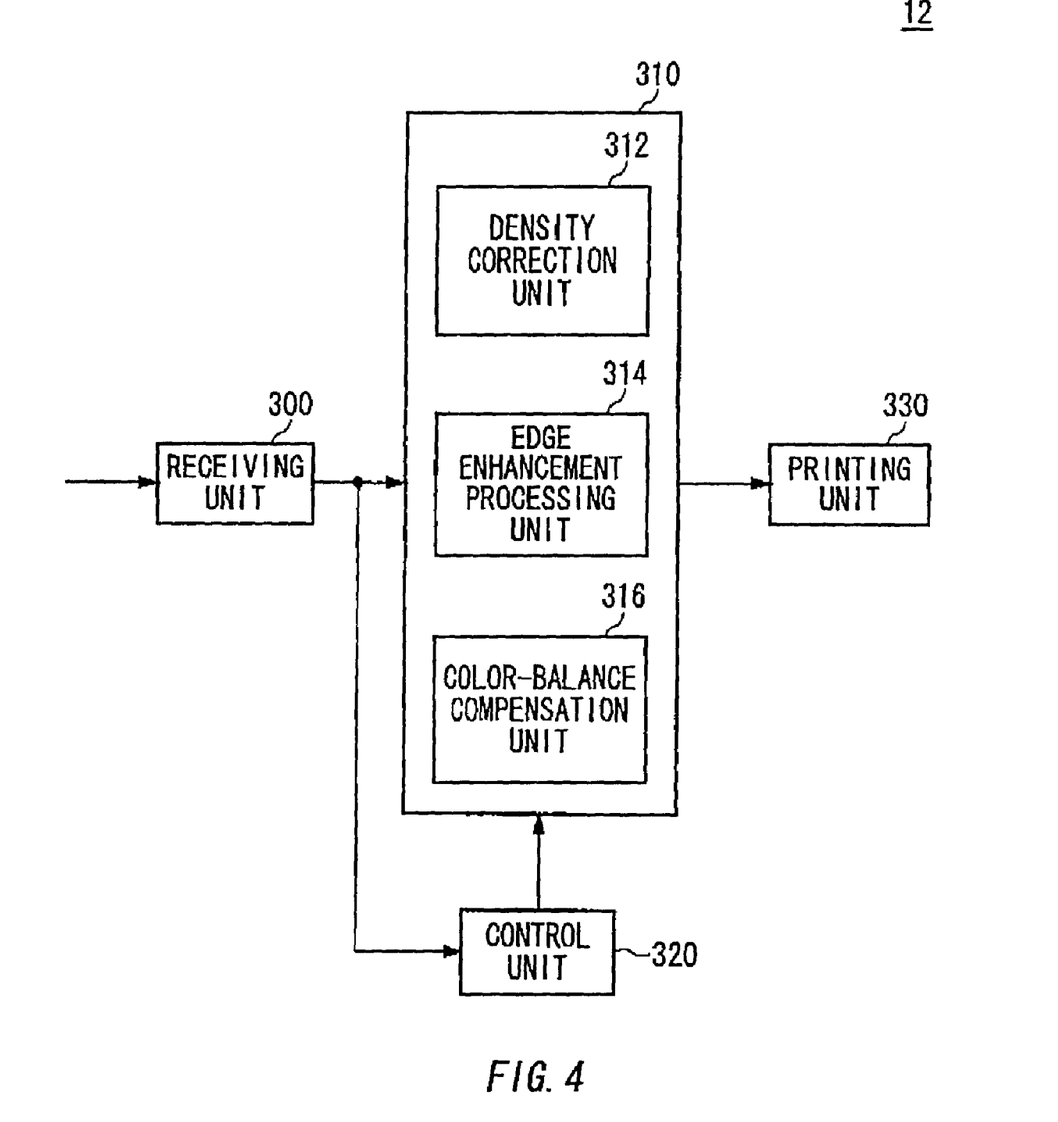
FIG. 4 is a block diagram showing an example of a functional configuration of a printer according to the present embodiment.

FIG. 4 is a block diagram showing an example of a functional configuration of the printer 12 according to the present embodiment. The printer 12 includes a receiving unit 300, an image processing unit 310, a control unit 320, and a printing unit 330. The image processing unit 310 includes a density correction unit 312, an edge enhancement processing unit 314, and a color-balance compensation unit 316.

The receiving unit 300 receives image data which indicates the image, resolution conversion information which indicates a procedure of resolution conversion processing performed on the image, and edge enhancement processing information which indicates a procedure of edge enhancement processing performed on the image. The receiving unit 300 may further receive image pick-up condition information and incidental information. Specifically, the receiving unit 300 receives at least one of information which indicates whether electronic zoom processing is performed, information which indicates zoom magnification in electronic zoom processing, information which indicates resolution before and after the resolution conversion processing, information which indicates the number of pixels interpolated by the interpolation processing, or the like, as the resolution conversion information.

The receiving unit 300 also receives, for example, at least one of information which indicates whether edge enhancement processing is performed, information which indicates whether the edge enhancement processing is performed before the resolution conversion processing or it is performed after the resolution conversion processing, information which indicates whether the edge enhancement processing is performed according to the resolution conversion, information which indicates a level of the edge enhancement processing performed on the image, or the like, as the edge enhancement processing information.

The image processing unit 310 performs a few kinds of image processing on the image which indicates the image data received by the receiving unit 300. Specifically, the density correction unit 312 performs density correction of the image. The edge enhancement processing unit 314 performs edge enhancement processing of the image. The color-balance compensation unit 316 performs color-balance compensation of the image.

The control unit 320 controls the image processing unit 310 based on the various information received by the receiving unit 300 so as to change a procedure of the image processing performed by the image processing unit 310. Especially, the control unit 320 controls a level of the edge enhancement processing by the edge enhancement processing unit 314 based on the resolution conversion information received by the receiving unit 300. Specifically, the control unit 320 enlarges a level of the edge enhancement processing performed by the edge enhancement processing unit 314 as a level of the resolution conversion indicated in the resolution conversion information becomes high.

For example, when the resolution conversion information is information which indicates zoom magnification in the electronic zoom processing, the control unit 320 enlarges a level of the edge enhancement processing by the edge enhancement processing unit 314 as zoom magnification becomes high. When the resolution conversion information is information which indicates whether the electronic zoom processing is performed, the control unit 320 enlarges a level of the edge enhancement processing by the edge enhancement processing unit 314 on the image on which the electronic zoom processing is performed, more than on the image on which electronic zoom processing is not performed.

When the resolution conversion information is information which indicates the resolution before and after the resolution conversion, the control unit 320 enlarges a level of the edge enhancement processing by the edge enhancement processing unit 314 as difference of the resolution before and after resolution conversion becomes large. When the resolution conversion information is information which indicates the number of pixels interpolated by the interpolation processing, the control unit 320 enlarges a level of the edge enhancement processing by the edge enhancement processing unit 314 as the number of the interpolated pixels becomes large.

The control unit 320 also controls a level of the edge enhancement by the edge enhancement processing unit 314 based on the edge enhancement processing information received by the receiving unit 300. For example, when the edge enhancement processing information is information which indicates whether edge enhancement processing is performed, the control unit 320 enlarges a level of the edge enhancement processing by the edge enhancement processing unit 314 on the image on which the edge enhancement processing is not performed more than on the image on which the edge enhancement processing is performed. When the edge enhancement processing information is information which indicates whether the edge enhancement processing is performed before the resolution conversion processing or it is performed after the resolution conversion processing, the control unit 320 enlarges a level of the edge enhancement processing by the edge enhancement processing unit 314 on the image on which the edge enhancement is performed before the resolution conversion more than on the image on which edge enhancement is performed after resolution conversion.

When the edge enhancement processing information is information which indicates whether the edge enhancement processing is performed according to the resolution conversion, the control unit 320 controls a level of the edge enhancement processing by the edge enhancement processing unit 314 to a predetermined level set in the printer 12. The predetermined level is a level of the edge enhancement processing preset at a factory, or a level of the edge enhancement processing set by a user of the printer 12. When the edge enhancement processing information is information which indicates a level of the edge enhancement processing performed on the image, the control unit 320 lowers a level of the edge enhancement processing by the edge enhancement processing unit 314 as a level of the edge enhancement performed on the image becomes high.

The printing unit 330 prints out the image, on which the image processing is performed by the image processing unit 310.

Figure 5:
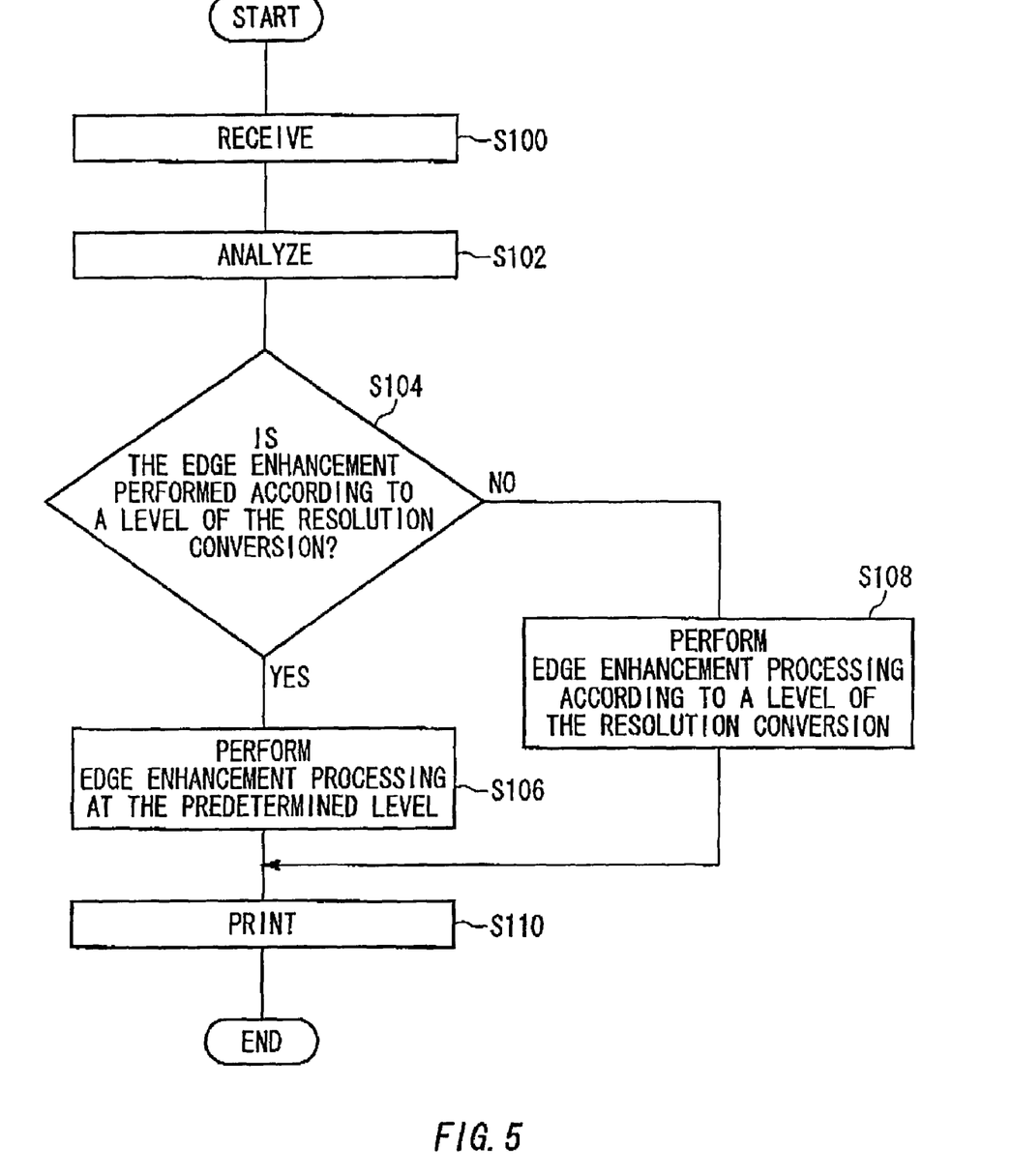
FIG. 5 is a flow chart showing an example of operation of the printer according to the present embodiment.

FIG. 5 is a flow chart showing an example of operation of the printer 12 according to the present embodiment. First, the receiving unit 300 receives the image data, the resolution conversion information, and the edge enhancement processing information (S100). Next, the control unit 320 analyzes the resolution conversion information and the edge enhancement processing information received by the receiving unit 300 in S100 (S102). Next, the control unit 320 judges whether edge enhancement is performed according to a level of resolution conversion based on the resolution conversion information and the edge enhancement processing information (S104).

In S104, if it is judged that the edge enhancement is performed according to a level of the resolution conversion, the control unit 320 controls a level of the edge enhancement by the edge enhancement processing unit 314 to a predetermined level. Next, based on the control by the control unit 320, the edge enhancement processing unit 314 performs edge enhancement processing on the image at the predetermined level (S106). In S104, if it is judged that edge enhancement is not performed according to a level of the resolution conversion, the control unit 320 controls a level of the edge enhancement by the edge enhancement processing unit 314 based on a level of the resolution conversion indicated in the resolution conversion information. Next, based on the control by the control unit 320, the edge enhancement processing unit 314 performs edge enhancement processing on the image at a certain level which is directed from the control unit 320 (S108). Next, the printing unit 330 converts the image, on which the edge enhancement is performed by the edge enhancement processing unit 314, into data format for printing, and prints out the image (S110). The sequential function flow of the operation of the printer 12 in this example is ended hereinbefore.

Figure 6:
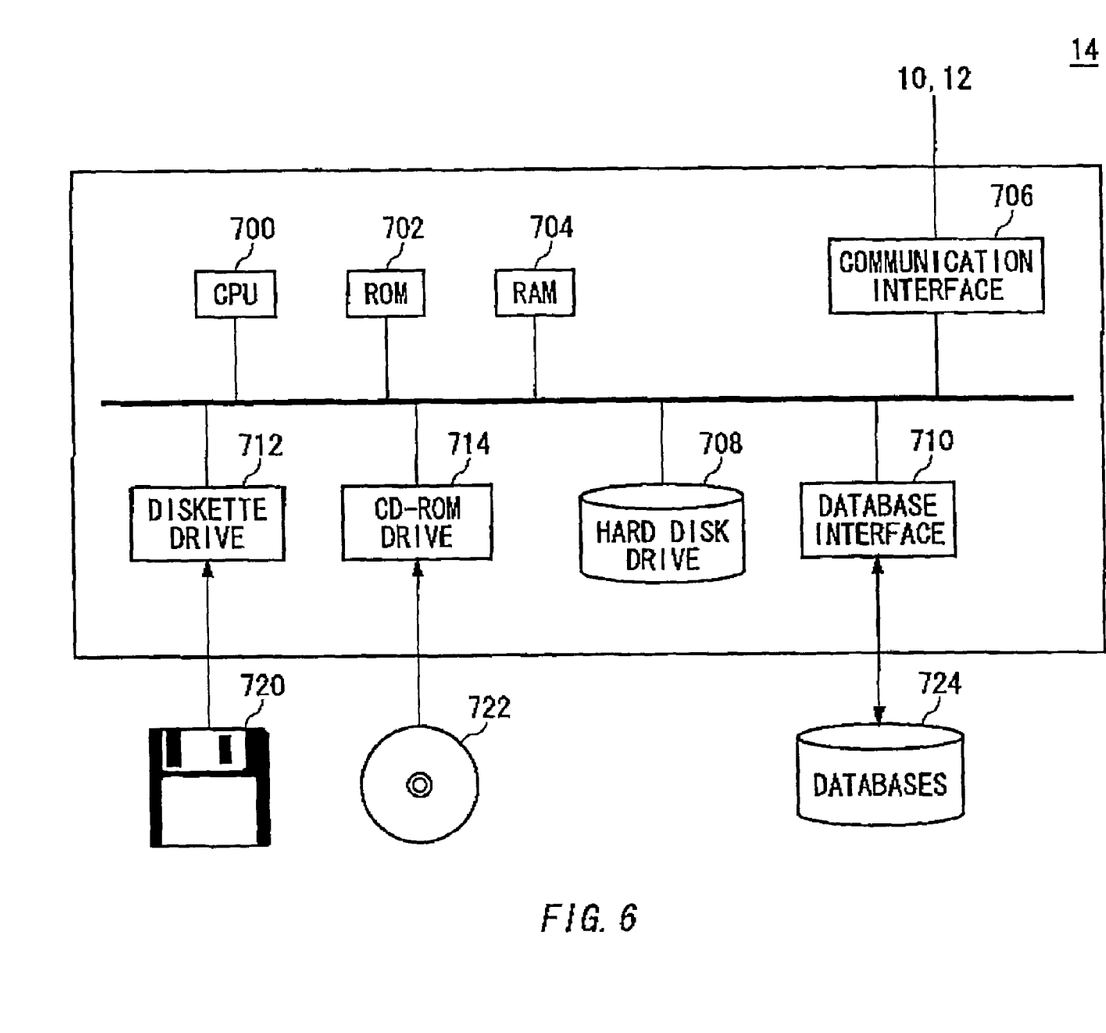
FIG. 6 is a block diagram showing an example of a hardware configuration of a personal computer according to the present embodiment.

FIG. 6 is a block diagram showing an example of a hardware configuration of the personal computer 14 according to the present embodiment. The personal computer 14 includes CPU 700, ROM 702, RAM 704, a communication interface 706, a hard disk drive 708, a database interface 710, a diskette drive 712, and a CD-ROM drive 714. The CPU 700 operates based on a program stored in the ROM 702 and the RAM 704, and controls each unit. The personal computer 14 communicates with the digital camera 10 and the printer 12 through the communication interface 706. The database interface 710 writes data in a database, and updates the contents of the database.

The diskette drive 712 reads data or a program in a diskette 720, and provides the data or the program to the communication interface 706. The CD-ROM drive 714 reads data or a program in CD-ROM 722, and provides the data or the program to the communication interface 706. The communication interface 706 transmits the data or the program provided by the diskette drive 712 or the CD-ROM drive 714 to the digital camera 10 or the printer 12. The database interface 710 connects with various databases 724, and transmits and receives data to/from the databases 724.

The program for the printer 12 is provided by a user, being stored in a record medium such as the diskette 720 or the CD-ROM 722. The program stored in the record medium may be either compressed or decompressed. The program is read from the record medium, installed in the digital camera 10 or the printer 12 through the communication interface 706, and executed in the digital camera 10 or the printer 12.

The program in the record medium, which is installed in the digital camera 10, includes an image pick-up module, a resolution conversion module, a storing module, an edge enhancement processing module, and an output module as a functional configuration. Since the function of the modules, by which the digital camera 10 is manipulated, is the same as the operation of the corresponding component in the digital camera 10 explained by FIGS. 1 to 5, explanation of the function of the modules is omitted.

The program in the record medium, which is installed in the printer 12, includes a receiving module, an edge enhancement processing module, a control module, and a printing module as a functional configuration. Since the function of the modules, by which the printer 12 is manipulated, is the same as the operation of the corresponding component in the printer 12 explained by FIGS. 1 to 5, explanation of the function of the modules is omitted.

Apart or all functions of the operation of the digital camera 10 or the printer 12 in the present embodiment explained in this patent application are storable in the diskette 720 or the CD-ROM 722, which are examples of the record media depicted in FIG. 6.

These programs may be read from the record medium and be executed directly by the digital camera 10 or the printer 12, or may be executed after the programs are installed in the digital camera 10 or the printer 12. The programs may be stored either on a single record medium or a plurality of record media. The programs may be stored in an encoded form.

It is possible to use an optical record medium such as DVD or PD, a magneto-optical record medium such as Minidisk, a tape medium, a magnetic record medium or a semiconductor memory such as an IC card or a Miniature Card as a record medium instead of the diskette or the CD-ROM. A storage device, such as a hard disk or RAM in a server system on a dedicated communication network or the Internet, may be used as a record medium and the program may be provided to the digital camera 10 or the printer 12 via the communication network. Such recording media shall be used only for manufacturing the digital camera 10 or the printer 12 and it is obvious that manufacturing or selling of such recording media, in the course of trade, shall be deemed to be an infringement of a patent right based on this application.

Figure 7:
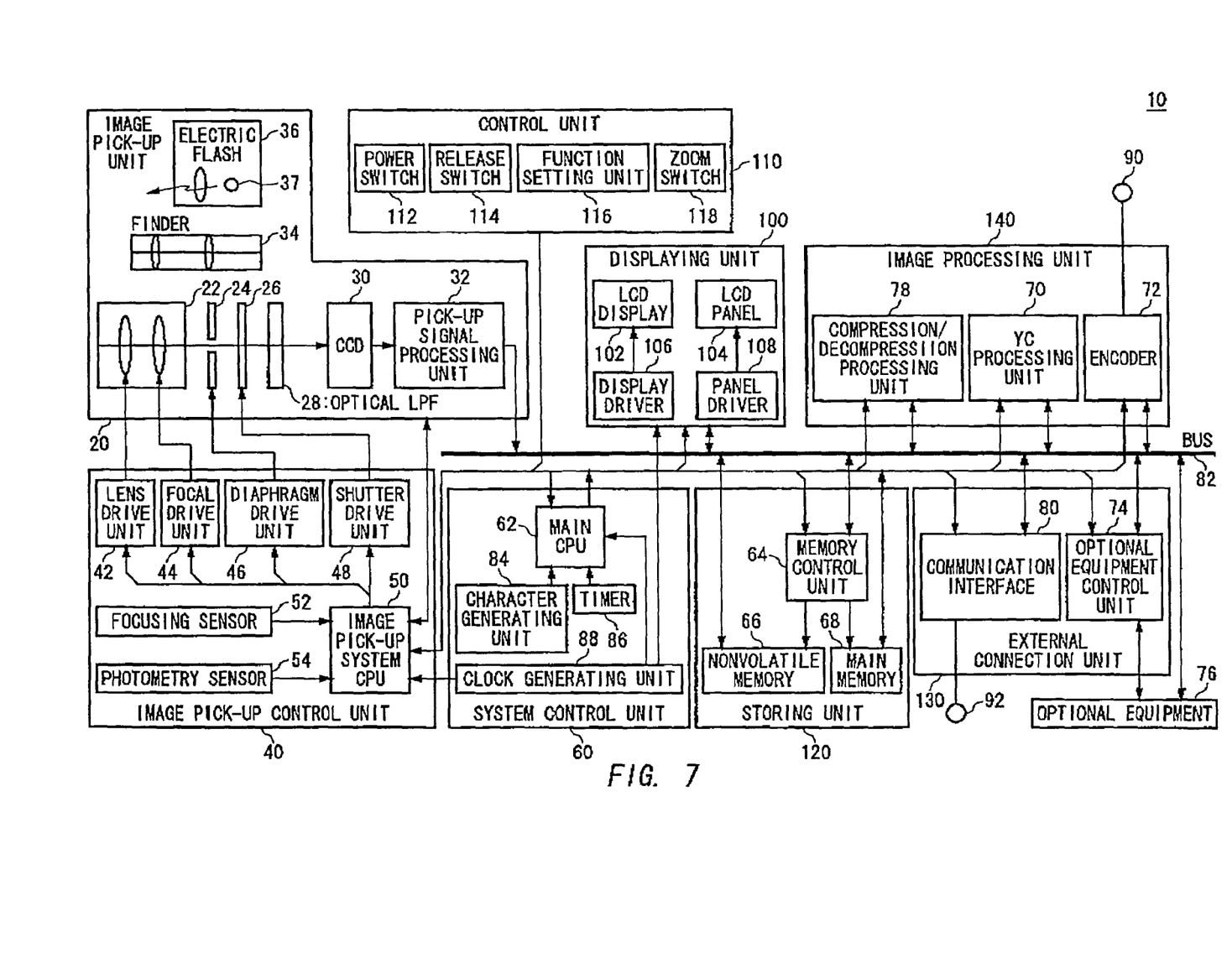
FIG. 7 is a block diagram showing an example of a detailed configuration of the digital camera according to the present embodiment.

FIG. 7 is a block diagram showing an example of a detailed configuration of the digital camera 10 according to the present embodiment. The digital camera 10 includes the image pick-up unit 20, an image pick-up control unit 40, a system control unit 60, a displaying unit 100, a control unit 110, the storing unit 120, the image processing unit 140, and an external connection unit 130.

The image pick-up unit 20 includes a taking-lens unit 22, a diaphragm 24, a shutter 26, optical LPF 28 (low pass filter), CCD 30 (charge-coupled device), a pick-up signal processing unit 32, a finder 34, and an electric flash 36.

The taking-lens unit 22 takes and processes a subject image. The taking-lens unit 22 includes a focal lens, a zoom lens, etc., and forms the image of the subject onto surface of the CCD 30. The diaphragm 24 limits the light which passed the taking-lens unit 22, and the optical LPF 28 passes light having longer wavelength component than a predetermined wavelength, Each sensor element of the CCD 30 stores charge according to quantity of light of the formed subject image (the charge is referred to as "stored charge" hereinafter).

The shutter 26 is a mechanical shutter and controls whether to form the image of the light onto the CCD 30, the light passing the taking-lens unit 22. The digital camera 10 may include an electronic shutter function instead of the mechanical shutter 26. In order to realize the electronic shutter function, the sensor element of the CCD 30 has a shutter gate and a shutter drain. The stored charge is discharged to the shutter drain by turning on the shutter gate. Time of storing the charge to each of the sensor, i.e., shutter speed, is controllable by controlling the shutter gate. In the CCD 30, the stored charge is read by a shift register by applying a readout gate pulse, and is read sequentially as a voltage signal by applying the register transfer pulse.

The pick-up signal processing unit 32 separates the voltage signal indicating the subject image outputted from the CCD 30, i.e., an analog signal, into R, G, and B components. The pick-up signal processing unit 32 adjusts white balance of the subject image by adjusting R, G, and B components. The pick-up signal processing unit 32 performs gamma correction of the subject image. The pick-up signal processing unit 32 converts the analog signal, which is separated into R, C, and B components, to a digital signal, and image data of the digital signal of the subject image (referred to as "digital image data" hereinafter), obtained by the A/D conversion, is outputted to the system control unit 60.

The finder 34 may have a displaying means and may display various information from below-mentioned main CPU 62, etc. The electric flash 36 includes a discharge tube 37, which discharges energy stored in a capacitor, and when the energy is supplied to the discharge tube 37, the electric flash 36 functions by the discharge tube 37 emitting light.

The image pick-up control unit 40 includes a lens drive unit 42, a focal drive unit 44, a diaphragm drive unit 46, a shutter drive unit 48, an image pick-up system CPU 50 which controls the drive units above, a focusing sensor 52, and a photometry sensor 54. The lens drive unit 42, the focal drive unit 44, the diaphragm drive unit 46, and the shutter drive unit 48 include driving means, such as a stepping motor, and drive mechanical components in the image pick-up unit 20. According to depression of a below-mentioned release switch 114, the focusing sensor 52 measures distance to the subject, and the photometry sensor 54 measures brightness of the subject. The focusing sensor 52 and the photometry sensor 54 supply focusing data and photometry data to the image pick-up system CPU 50, where the focusing data means the data of the measured distance to the subject, and the photometry data means the data of the measured brightness of the subject.

The image pick-up system CPU 50 controls the lens drive unit 42 and the focal drive unit 44, and adjusts a zoom magnification and a focus of the taking lens 22 based on photography information, such as a zoom magnification directed by a user. Alternatively, the image pick-up system CPU 50 may control the lens drive unit 42 and the focal drive unit 44, and may adjust a zoom magnification and a focus based on the focusing data received from the focusing sensor 52 and/or the photometry data received from the photometry sensor 54.

The image pick-up system CPU 50 determines stop and shutter speed based on an integral value of the R, G, and B digital signals in one image frame, i.e., automatic exposure (AE) information. The diaphragm drive unit 46 and the shutter drive unit 48 control the aperture size of the diaphragm 24, and the opening and closing of the shutter 26 according to the determined value.

The image pick-up system CPU 50 controls light emission of the electric flash 36 based on the photometry data, and adjusts the aperture size of the diaphragm 26 simultaneously. When the user instructs to take an image, the CCD 30 starts to store the charge and outputs the stored charge to the pick-up signal processing unit 32 after the shutter time calculated from the photometry data is elapsed.

The system control unit 60 includes main CPU 62, a character generating unit 84, a timer 86, and a clock generating unit 88. The main CPU 62 controls entire parts of the digital camera 10, especially the system control unit 60. The main CPU 62 sends and receives required information to/from the image pick-up systems CPU 50 by serial communication or the like.

The clock generating unit 88 generates an internal clock of the main CPU 62, and supplies it to the main CPU 62. The clock generating unit 88 also generates internal clocks of the image pick-up system CPU 50 and the displaying unit 100. The clock generating unit 88 may supply the clocks having different frequencies to the main CPU 62, the image pick-up system CPU 50, and the displaying unit 100, respectively.

The character generating unit 84 generates text and graphic information, which is superimposed onto the captured image, such as date/time or a title of the image. A timer 86 has backing of battery etc., counts time always, and supplies time information, such as information about the captured date/time of the captured image, to the main CPU 62 based on the counted value. It is preferable that the timer 86 counts time with the power supplied from the battery, even when main power supply of the digital camera is switched off. It is also preferable that the character generating unit 84 and the timer 86 are annexed to the main CPU 62.

The storing unit 120 includes a memory control unit 64, nonvolatile memory 66, and main memory 68. The memory control unit 64 controls the nonvolatile memory 66 and the main memory 68. The nonvolatile memory 66 is composed of EEPROM (electrically erasable programmable read only memory) or flash memories etc., and stores it with data which is to be held even when the power supply of the digital camera 10 is switched off, such as setting information set by a user or a factory preset value. The nonvolatile memory 66 may store a boot program, a system program, etc. of the main CPU 62.

It is preferable that the main memory 68 is composed of memory which is relatively inexpensive and has large capacity, like DRAM. The main memory 68 has a function as frame memory to store the data outputted from the image pick-up unit 20, a function as system memory which loads various programs, and a function as a work area. The nonvolatile memory 66 and the main memory 68, communicate with each part inside/outside the system control unit 60 through a bus 82. The nonvolatile memory 66 may further store the digital image data.

The image processing unit 140 includes an YC processing unit 70, an encoder 72, and a compression/decompression processing unit 78. The external connection unit 130 includes an optional equipment control unit 74 and a communication interface 80. The encoder 72, the optional equipment control unit 74, and the communication interface 80 are examples of the output unit 170.

The YC processing unit 70 performs YC conversion to the digital image data, and generates a luminance signal Y, a color difference signals B-Y and R-Y. The main memory 68 stores the luminance signal and the color difference signals based on control of the memory control unit 64.

The compression/decompression processing unit 78 reads and compresses the luminance signal and the color difference signals sequentially from the main memory 68. Then the optional equipment control units 74 writes the compressed digital image data (referred to as "compressed data") in a memory card which is an example of the optional equipment 76.

The encoder 72 converts the luminance signal and the color difference signals into a video signal (NTSC or PAL signal), and outputs the video signal from a terminal 90. When generating the video signal from the compressed data recorded on the optional equipment 76, the compressed data is supplied to the compression/decompression processing unit 78 at first through the optional equipment control unit 74. Then, the data is decompressed in the compression/decompression processing unit 78 and the encoder 72 converts the decompressed data into the video signal.

The optional equipment control unit 74 performs generation, logical conversion, and/or voltage conversion of the signal that flows between the bus 82 and the optional equipment 76, in order to conform the signal to the specification of the optional equipment 76 and the bus 82. Other than the above-mentioned memory card, the digital camera 10 may support a standard PCMCIA I/O card, for example, as the optional equipment 76. In this case, the optional equipment control unit 74 may be composed of bus control LSI for PCMCIA standard or the like.

The communication interface 80 performs control such as protocol conversion to comply with the communication specification supported by the digital camera 10, e.g., USB, RS-232C, Ethernet, etc. The communication interface 80 may output the compressed data or the digital image data to external equipment or to a network through a terminal 92. The communication interface 80 includes a driver IC if necessary and communicates with an external equipment through the terminal 92. The communication interface 80 may communicate with the external equipment, such as a printer, a Karaoke machine or a video game machine, through an original standard interface.

The displaying unit 100 includes an LCD display 102, an LCD panel 104, a display driver 106, and a panel driver 108. The display driver 106 controls the LCD display 102. The panel driver 108 controls the LCD panel 104. The LCD display 102 is positioned on the back face of the camera, of which the size is about 2 inches for example, and displays an image currently captured, a playback image, zoom magnification of the captured or playback image, remaining battery charge, date/time, mode selection screen, a subject image, etc. The LCD panel 104 is a monochrome LCD, for example, is positioned on top face of the camera, and displays information, such as quality of the image (fine, normal, basic, etc.), flash mode (forced flash, suppressed flash, etc), number of available frames, number of pixels, and remaining battery charge.

The control unit 110 includes a power switch 112, a release switch 114, a function setting unit 116, and a zoom switch 118. The power switch 112 switches the digital camera 10 on and off based on direction of a user. The release switch 114 can be depressed in two levels, i.e., halfway depression and full depression. For example, when the release switch 114 is depressed halfway, the image pick-up control unit 40 performs automatic focusing and automatic exposure, and the image pick-up unit 20 captures a subject image by depressing the release switch 114 fully.

The function setting unit 116 is, for example, a rotatable mode dial or a 4-direction button and accepts settings such as "file format", "special effect", "print", "determine/save", "change display", etc. The zoom switch 118 accepts setting of zoom magnification of the subject image captured by the image pick-up unit 20.

The digital camera 10 having the above-mentioned structure operates in the following manner. First, the power switch 112 is depressed and power is supplied to each part of the digital camera 10. The main CPU 62 judges whether the digital camera 10 is in photography mode or in playback mode by reading status of the function setting unit 116.

When a digital camera 10 is in photography mode, the main CPU 62 supervises the depression status of the release switch 114. When the half-depression of the release switch 114 is detected, the image pick-up system CPU 50 acquires photometry data and focusing data from the photometry sensor 54 and the focusing sensor 52, respectively. The image pick-up control unit 40 adjusts focus and stop of the image pick-up unit 20, etc. based on the photometry data and the focusing data acquired by the image pick-up system CPU 50. After the adjustment, the LCD display 102 informs a user about the completion of the adjustment by displaying characters, such as "standby".

Then, the main CPU 62 supervises the depression status of the release switch 114. When the full-depression of the release switch 114 is detected, the shutter 26 is closed after a predetermined shutter time is elapsed and the stored charge of the CCD 30 is discharged to the pick-up signal processing unit 32. The digital image data, generated as a result of processing by the pick-up signal processing unit 32, is outputted to the bus 82. The digital image data is once stored in the main memory 68, then it is processed in the YC processing unit 70 and the compression/decompression processing unit 78, and is recorded in the optional equipment 76 via the optional equipment control unit 74. The captured image based on the recorded digital image data is displayed on the LCD display 102 for a while, so that a user can check the captured image. As described above, a sequence of the photographing operation is finished.

On the other hand, when the digital camera 10 is in playback mode, the main CPU 62 reads the captured image from the main memory 68, the nonvolatile memory 66, and/or the optional equipment 76, and displays the image on the LCD display 102 of the displaying unit 100.

In this state, when a user directs either "move forward" or "move backward" on the function setting unit 116, the main CPU 62 reads another captured image stored in the main memory 68, the nonvolatile memory 66, and/or the optional equipment 76, and displays the image on the LCD display 102 of the displaying unit 100.

According to the image processing system of the present embodiment, by the digital camera 10 recording the resolution conversion information and the edge enhancement processing information into the image data and outputting them to the printer 12, the printer 12 can judge whether appropriate edge enhancement has been performed already in the digital camera 10 based on the resolution conversion information and the edge enhancement processing information. The printer 12 can also determine how much the edge enhancement is to be performed on the image. Therefore, the printer 12 can perform appropriate edge enhancement processing on the image and a desired quality of an image can be printed out.

As described above, the present invention provides the image processing system which appropriately performs image processing on an image captured by the image capturing apparatus.

Although the present invention has been described by way of an exemplary embodiment, it should be understood that those skilled in the art might make many changes and substitutions without departing from the spirit and the scope of the present invention which is defined only by the appended claims.

What is claimed is:

1. An image processing system comprising:
    an image capturing apparatus for capturing an image of a subject, the image capturing apparatus including:
    an image pick-up unit which captures the image;
    a resolution conversion unit which performs resolution conversion processing on the image by interpolation processing in electronic zoom processing;
    an edge enhancement processing unit which performs edge enhancement processing on the image;
    a storing unit which stores resolution conversion information in association with the image, the resolution conversion information indicating zoom magnification of the electronic zoom processing, and edge enhancement processing information, which indicates a procedure of the edge enhancement processing performed by said edge enhancement processing unit, in association with the image; and
    an output unit which outputs the resolution conversion information and the edge enhancement processing information in association with the image; and
    an image processing apparatus for performing image processing on the image including:
    a receiving unit which receives the image and the resolution conversion information and the edge enhancement processing information;
    an edge enhancement processing unit which performs edge enhancement processing on the image; and
    a control unit which controls a level of edge enhancement processing by said edge enhancement processing unit based on the resolution conversion information and the edge enhancement processing information;
    wherein said control unit of the image processing apparatus further judges whether the edge enhancement processing performed by the image capturing apparatus has been performed according to a level of the resolution conversion processing performed by the image capturing apparatus based on the resolution conversion information and the edge enhancement processing information, and decides a level of edge enhancement processing performed by the image processing apparatus based on the judgment such that if the resolution conversion information indicates that the resolution conversion processing procedure performed on the image was interpolation processing in electronic zoom processing, and the edge enhancement processing information indicates that the edge enhancement processing performed by the image capturing apparatus has been performed at a predetermined level irrespective of the resolution conversion processing performed by the image capturing apparatus, then said control units control the level of edge enhancement performed by the image processing apparatus based on a zoom magnification of the image capturing apparatus including in said resolution conversion information; and if the edge enhancement processing information indicates that edge processing performed by the image apparatus was performed according to the resolution conversion processing performed by the image apparatus, then said control unit control the level of edge enhancement performed by the image processing apparatus to a predetermined level.

2. An image processing apparatus which performs image processing on an image, comprising:

a receiving unit which receives the image, resolution conversion information which indicates a procedure of resolution conversion processing performed by the image capturing apparatus on the image, and edge enhancement processing information which indicates a procedure of resolution conversion processing performed by the image capturing apparatus on the image, and edge enhancement processing information which indicates a procedure of edge enhancement processing performed on the image by an image capturing apparatus;

an edge enhancement processing unit which performs edge enhancement processing on the image; and a control unit which controls a level of edge enhancement processing performed by said edge enhancement processing unit based on the resolution conversion information, and the edge enhancement processing information;

said control unit further judges whether the edge enhancement processing performed by the image capturing apparatus is has been performed according to a level of the resolution conversion processing performed by the image capturing apparatus based on the resolution conversion information and the edge enhancement processing information, and decides a level of edge enhancement processing performed by the image processing apparatus based on the judgment such that if the resolution conversion information indicates that the resolution conversion processing procedure performed on the image was interpolation processing in electronic zoom processing of the image capturing apparatus, and the edge enhancement processing information indicates that the edge enhancement processing performed by the image capturing apparatus has been performed at a predetermined level irrespective of the resolution conversion processing performed by the image capturing apparatus, then said control unit controls the level of edge enhancement performed by the image processing apparatus based on a zoom magnification of the image capturing apparatus included in said resolution conversion information; and if the edge enhancement processing information indicates that edge processing performed by the image apparatus was performed according to the resolution conversion processing performed by the image apparatus, then said control unit control the level of edge enhancement performed by the image processing apparatus to a predetermined level.

3. The image processing apparatus as claimed in claim 2, wherein said control unit enlarges a level of edge enhancement processing performed by said edge enhancement processing unit as a level of resolution conversion, which is indicated in the resolution conversion information, becomes high.

4. The image processing apparatus as claimed in claim 2, wherein said control unit enlarges a level of edge enhancement processing performed by said edge enhancement processing unit as the zoom magnification becomes high.

5. The image processing apparatus as claimed in claim 2, further comprising a printing unit which prints out the image, on which edge enhancement processing is performed by said edge enhancement processing unit.

6. An image processing method which performs image processing on an image, comprising steps of:

receiving the image and, resolution conversion information which indicates a procedure of resolution conversion processing performed by an image capturing apparatus on the image, and edge enhancement processing information which indicates a procedure of edge enhancement processing performed by the image capturing apparatus on the image;

performing edge enhancement processing on the image; and judging whether edge enhancement performed by the image capturing apparatus is has been performed according to a level of the resolution conversion processing performed by the image capturing apparatus based on the resolution conversion information the edge enhancement processing information;

determining a level of edge enhancement processing based on the judgment;

controlling a level of edge enhancement processing performed in said edge enhancement processing performing step based on the resolution conversion information and the edge enhancement processing information;

wherein if the resolution of the received image has been converted by interpolation processing in electronic zoom processing by an the image capturing apparatus, and the resolution conversion information includes zoom magnification of the electronic zoom processing of the image capturing apparatus, and the edge enhancement processing information indicates that the edge enhancement processing performed by the image capturing apparatus has been performed at a predetermined level irrespective of the resolution conversion processing performed by the image capturing apparatus, then and the level of edge enhancement is determined based on the zoom magnification.; and if the edge enhancement processing information indicates that edge processing performed by the image apparatus was performed according to the resolution conversion processing performed by the image apparatus, then the level of edge enhancement is determined to a predetermined level.

7. A computer readable medium storing thereon a program for an image processing apparatus which performs image processing on an image, the program comprising:

a receiving module which allows the image processing apparatus to receive the image and resolution conversion information which indicates a procedure of resolution conversion processing performed by an image capturing apparatus on the image, and edge enhancement processing information which indicates a procedure of edge enhancement processing performed by the image capturing apparatus on the image;

an edge enhancement processing module which allows the image processing apparatus to perform edge enhancement processing on the image; and a control module configured to:

judge whether edge enhancement performed by the image apparatus is has been performed according to a level of the resolution conversion processing performed by the image capturing apparatus based on the resolution conversion information the edge enhancement processing information;

determine a level of edge enhancement processing based on the judgment; and control a level of the edge enhancement processing by said edge enhancement processing module based on the resolution conversion information and the edge enhancement processing information;

wherein if the resolution of the received image has been converted by interpolation processing in electronic zoom processing by an the image capturing apparatus, and the resolution conversion information includes zoom magnification of the electronic zoom processing of the image capturing apparatus and the edge enhancement processing information indicates that the edge enhancement processing performed by the image capturing apparatus has been performed at a predetermined level irrespective of the resolution conversion processing performed by the image capturing apparatus, then the level of edge enhancement is determined based on the zoom magnification; and if the edge enhancement processing information indicates that edge processing performed by the image apparatus was performed according to the resolution conversion processing performed by the image apparatus, then the level of edge enhancement is determined to a predetermined level.

* * * * *